United States Patent [19]
Draeger et al.

[11] Patent Number: 5,371,692
[45] Date of Patent: Dec. 6, 1994

[54] ACTIVATING CIRCUIT FOR MODIFYING OR ADDING A NEW PROGRAM TO AN ELECTRONIC DEVICE

[75] Inventors: Juergen Draeger, Tübingen, Germany; Guenter Paret, Herrenberg, both of Germany

[73] Assignee: Hewlett-Packard Company, Palo Alto, ; new program to an electronic device 5 08291994 12 084 12061994 DEX Germany 05211990 90109653 24 1 1 Wachsman; Hal D. Harvey; Jack B. 4 6 11

[21] Appl. No.: 668,086

[22] Filed: Mar. 12, 1991

[30] Foreign Application Priority Data

May 21, 1990 [DE] Germany .......................... 90109653

[51] Int. Cl.⁵ .............................................. G05B 19/00
[52] U.S. Cl. .................. 364/580; 364/413.01; 340/825.31; 340/825.34; 340/825.22; 340/825.5; 379/95; 380/4; 380/23
[58] Field of Search ............... 340/825.31, 825.34, 340/825.22, 825.5; 364/413.01, 580; 380/4, 23; 379/95

[56] References Cited

U.S. PATENT DOCUMENTS

| | | | |
|---|---|---|---|
| 3,984,637 | 10/1976 | Caudill et al. | 179/2 |
| 4,353,064 | 1/1982 | Stamm | 340/825.31 |
| 4,573,046 | 2/1986 | Pinnow | 340/825.31 |
| 4,829,296 | 5/1989 | Clark et al. | 340/825.31 |
| 4,839,628 | 6/1989 | Davis et al. | 340/825.5 |
| 4,851,653 | 7/1989 | Limisuque et al. | 340/82.531 |
| 5,012,234 | 4/1991 | Dulaney et al. | 340/825.31 |
| 5,099,516 | 3/1992 | Durkin et al. | 380/4 |
| 5,109,221 | 4/1992 | Lambropoulos et al. | 340/825.31 |

FOREIGN PATENT DOCUMENTS

| | | |
|---|---|---|
| 0217351 | 9/1986 | European Pat. Off. . |
| 338290 | 3/1989 | European Pat. Off. . |
| WO85/02310 | 5/1985 | WIPO . |

*Primary Examiner*—Jack B. Harvey
*Assistant Examiner*—Hal D. Wachsman

[57] ABSTRACT

An electronic device such as a medical monitor (1) operates under program control; if the program needs to be updated, or if new programs or test procedures are to be added, an activating circuit (7) containing a microprocessor and non-volatile memory is connected to the electronic device. The microprocessor executes a program which consists of two modules: the first module establishes communication with the electronic device and the second module transmits activating code, program code or a test code to the electronic device. It is possible either to download new programs or to activate programs which already exist in the electronic device.

24 Claims, 4 Drawing Sheets

ACTIVATING CIRCUIT FOR MODIFYING OR ADDING A NEW PROGRAM TO AN ELECTRONIC DEVICE

FIELD OF THE INVENTION

The present invention generally relates to programmable electronic devices. More particularly, the present invention relates to methods and apparatuses for activating and/or adding new capabilities to an electronic device operating at least partially under program control.

BACKGROUND OF THE INVENTION

A variety of electronic devices, such as measuring devices, medical monitors or test devices, perform their functions under control of a microprocessor. Although the measurement pickups (e.g., the test probe and input amplifiers of an oscillograph or data bus analyzer, or the electrodes and preamplifiers of a medical monitor) still consist of analog electronics, more complex functions are performed by the microprocessor. Such functions include guiding the user through menus, performing complex mathematical or statistical operations, presenting measurement results with, e.g., special graphics or the like, software filtering (i.e., software processing of data converted from analog to digital format), controlling certain hardware components (such as an amplifier), setting the bandwidth of a hardware filter, controlling an analog-to-digital converter, etc. These examples illustrate that a processor controlling an electronic device performs many complex functions; therefore the programs necessary for the processor are also very extensive and complex.

Implementing such extensive software functions creates new tasks and problems. For example, it is well-known that an extensive program package is seldom completely free of software errors (so-called "bugs"). Although most software manufacturers try to test their programs under many conditions, it is simply impossible to test a program under all possible conditions, particularly conditions which occur very seldom. Therefore, every complex program needs service: whenever a bug is detected, it must be identified and corrected; the corrected program must then be installed in place of the defective program. This is the reason many software suppliers provide so-called "updates" to their programs. In the updated version, the bugs detected up to a certain point in time have been fixed.

Another reason for installing a software update is to add a new feature to the existing software. For example, a new feature could include the support of a new interface, or the capability of communicating with the user in another language. An additional software feature may also be required when an extensive test of the electronic device is to be carried out. Typical monitors and measuring instruments contain one or more test programs (e.g., a self-test of the memory and input/output ports, carried out when power is turned on); however it is not possible or at least not economical to provide test software for all tests, in particular very special tests, in the standard software for most electronic devices. Accordingly, from time to time it is necessary to load special or extensive test programs in such devices.

In the field of large and medium-size computers, these problems are solved in two different ways:

1. In many cases, e.g. if an operating system update is needed, the new or revised program is installed by a service technician. The technician carries the new program(s) to the customer using magnetic media (such as a disc or tape) and loads the program(s) into the computer. This is a feasible solution for larger computers since the cost of a personal visit of the service technician is negligible compared to the value of the whole computer. Moreover, computer software of this size needs service from time to time anyway, so that a regular service visit may be combined with the installation of the software update.

2. If the revision, update or additional program belongs to a less critical environment of the computer (i.e., a program which is not part of or related to the operating system), then the new software may also be sent to the customer on disk or tape and the customer may be asked to install the new software himself or herself.

Unfortunately, these solutions are not suitable or cost-effective for measuring instruments, small computers and the like; the major reason therefore is that the expenses for a service technician's visit are not acceptable when compared to the cost of the overall system. Furthermore, the exchange of programs is often quite complicated from a technical standpoint, since, in most of these devices, the programs are stored in so-called "firmware"; therefore any software change requires that the electronic device be disassembled and certain memory chips (or complete printed circuit boards) be exchanged. Even in cases where the device comprises a disc drive or a magnetic tape unit, part of the software (in particular, the basic loading and input/output routines) is stored in ROM. On the other hand, since exchanging a ROM requires disassembly of the device, the exchange can only be performed by a qualified service technician. Therefore, in regard of the expenses involved, software updates of the kind described here are seldom asked for or provided.

The situation is even more critical in case of medical devices. In all such devices it is absolutely unacceptable to have a software update installed by the customer, as an erroneously-installed update could place a patient in serious danger. For example, even a minor error could cause distortion of an alarm limit so that the medical device will not initiate an alarm when the patient is in a clinically critical condition. Since this could lead to the death of the patient, it cannot be tolerated. As a consequence, software updates incorporating new features are seldom installed in medical devices; if an update is necessary due to detected errors in the existing software, enormous costs must be borne by the manufacturing company and/or customer.

SUMMARY OF THE INVENTION

It is therefore an object of the present invention to provide a device for implementing new features or updates of the programs in an electronic device, or to carry out extended test programs for the electronic device. The device should be easy to implement, cost-effective, easy to handle and usually not require the visit of a service technician. The present invention achieves these goals.

The present invention achieves the aforementioned goals by providing an activating circuit for an electronic device operating at least partially under program control. The activating circuit comprises a processor; memory means for storing information; means for coupling the activating circuit to the electronic device so that information can be exchanged between them; and program means stored in the memory means. The program means comprises first module means for setting up a communication with the electronic device, and second module means for transmitting information to the electronic device.

The second module means is set up to transmit program code to the electronic device in a first preferred embodiment of the invention. The second module means is set up to transmit an activating code to the electronic device in a second preferred embodiment of the invention. In a third preferred embodiment of the invention, the first module means is set up to receive an identification code from the electronic device and store the identification code in the memory means the first time it receives such identification code, and the first module is further set up to accept only the stored identification code and to prevent the second module means from transmitting data and/or code to the electronic device if the identification codes are not equal.

In another embodiment of the invention, the first module means is set up to receive an identification code from the electronic device and store the identification code in the memory means the first time it receives such identification code, and the second module means is set up to encode the transmitted information in response to the stored identification code.

In yet another embodiment of the invention, the first module means is set up to receive a status code from the electronic device, to compare the status code with a stored update code, and transfer control to the second module means if the status code is in a predefined relation to the update code. The first module means is preferably set up to transfer control to the second module means when the status code indicates a lower revision number or an earlier date than the update code or, alternatively, a higher revision number or a later date than the updated code.

In yet another embodiment, the second module means is set up to transmit a test code or test program to the electronic device.

According to the invention, a method for activating or adding new capabilities to an electronic device operating at least partially under program control comprises the steps of: coupling an activating circuit to the electronic device; setting up a communication between the activating circuit and the electronic device; and activating, changing or adding new capabilities to the electronic device by transmitting data and/or code from the activating circuit to the electronic device.

In addition, the method preferably further comprises the steps of transmitting an identification code from the electronic device to the activating circuit, storing the identification code in an erasable memory the first time it is received by the activating circuit, and thereafter comparing the received identification code with the stored identification code and transmitting data and/or code to the electronic device only if the identification codes are equal. In another preferred embodiment, the method further comprises the steps of transmitting a status code from the electronic device to the activating circuit, and comparing the status code with an update code stored in the activating circuit.

The invention also provides an electronic system, comprising an electronic device operating at least partially under program control and an activating circuit in accordance with the above description for activating or adding new capabilities to the electronic device.

DETAILED DESCRIPTION OF THE PREFERRED EMBODIMENTS

The activating circuit contains a processor, typically a microprocessor with low power consumption. This processor has access to a non-volatile memory such as a ROM or an EEROM (electrically erasable read only memory); preferably, the memory is integrated into the processor (many customary micro-processors, the so-called "one-chip microprocessors", offer this feature). The activating circuit is further set up for connection to the electronic device, preferably via a cable (there are also other solutions such as wireless transmission, as discussed below).

The program contained in the non-volatile memory consists of at least two modules: The first of these modules sets up a communication with the electronic device. This may be a "hand-shake" procedure in asynchronous transmission format. Typically, the activating circuit transmits a start code to the electronic device, and further communications between the activating circuit and electronic device are thereafter performed according to a predefined protocol. On the other hand, synchronous transmission or other transmission methods are also suitable.

Control is transferred, once the communication between the activating circuit and the electronic device is established, to a second module set up to transmit data and/or code to the electronic device. The second module actually transmits the data or code which adds additional functionality to the device.

There are several ways in which new functionality can be added to the processor of the electronic device: First, the data may comprise a new program(s) to be executed by the electronic device's processor. In this case, the new program(s) (or part of a new program, or a new subroutine(s)) are handled by the activating circuit just as data of any other kind; i.e., they are "downloaded" to the electronic device byte by byte. However, the receiving electronic device handles these data as program modules, i.e., stores them in the non-volatile program memory of its processor. There are several ways to ensure that the receiving electronic device treats the received data as a program or a program module; for example, the transmitted data may be identified by some special code as a program, or the communication may be set up in a way that only data representing a program can be transmitted.

Another possible way of adding additional functionality to the electronic device is to activate an existing program or program module. In this case, the program memory of the electronic device's processor already contains the necessary software to perform certain functions upon delivery to a customer, but these program(s) or program module(s) are not active. Upon transmission of an activating code, the program or program module is unlocked and available for execution by the electronic device's processor. This is an easy way of adding new functions to the electronic device; as only the activating code has to be transmitted, the communication between the activating circuit and the electronic device is very short and easy to implement.

An activating circuit of the kind described above may be used to install additional features in an electronic device—such as a measuring instrument—in a very easy and cost-effective manner. One of the major advantages of the activating circuit is that it eliminates the need for a personal visit of a service engineer, which is particularly important for medical technology. The present invention offers for the first time a way to activate additional features in a medical monitor without a service engineer's personal visit. Moreover, the activating circuit is quite inexpensive to manufacture, particularly if a one-chip microprocessor is used. In addition, the activating circuit may also be a personal computer or the like which can be used to activate a multiplicity of electronic devices. The activating circuit may be used to transmit program code or an activating code; the purpose may be to add additional functions, special tests, etc.

In case a memory or a memory board in the electronic device becomes defective, a service board may be used as a replacement which transmits a special service identification code to the activating circuit. Once the activating circuit has received and stored such a service identification code, it can be used in conjunction with all electronic devices containing a replacement board. Therefore, it is ensured that even in case of hardware malfunction the exchanged memories contain the same activated functions as were contained in the board which became defective.

A way to ensure that the activating device is used in conjunction with only one electronic device is to encode the transmitted data in accordance with a certain identification code. The identification code is used as a "key word" for the encoding algorithm. It is understood that, in this case, the activating circuit must store the first received identification code, and encode the transmitted information in a predefined manner, in accordance with the stored identification code. The electronic device, in this embodiment, is only capable of decoding the transmitted information if it contains the same identification code as stored in the activating circuit. The activating circuit in this embodiment can be used in conjunction with only one electronic device. Another possibility is to provide an activating circuit capable of communicating with a limited, predefined number of electronic devices, e.g., 5.

In another advantageous embodiment, the activating circuits first module is set up to receive a status code from the electronic device, compare the status code with a stored update code, and transfer control to the second module only if the status code is in a predefined relation to the update code. The status code may, e.g., represent a revision number or the date when the programs were released. In this embodiment, the identification code is not stored in the activating circuit if the electronic device already contains the activating code or program contained in the activating circuit. In other words: If the electronic device already contains the information to be transmitted from the activating circuit, the activating circuit is not "blocked" and can therefore be used to update another electronic device.

As already mentioned, there is a variety of ways to connect the activating circuit to the electronic device. In a customary solution, the activating circuit is contained in a housing and connected with the electronic device via a cable and a connector. According to this solution, the activating circuit may be sold as a separate part only suited to activate one electronic device. Preferably, the connection is made via a serial interface cable. A microprocessor, preferably the one-chip type with integrated non-volatile erasable memory, can be advantageously used in this case, as this reduces the number of components.

In addition, there are a multiplicity of other ways of connecting the activating circuit to the electronic device. For example, wireless communication with electromagnetic waves or infrared light may be used. In a further preferred embodiment, the activating circuit comprises a personal computer and connection is made over telephone lines. This is a very clever way of updating the electronic device; a simple telephone connection is made between the electronic device and the personal computer in a factory, and the activating code or program is downloaded over the telephone line. This method requires no extra hardware, and the personal computer may be used to activate any electronic device, even devices at remote locations.

A further preferred embodiment includes an integrated microprocessor which constitutes the activating device. One-chip microprocessors with integrated memory, even small ones with only four pins, are available on the market. Such a microprocessor is inserted in a socket in the electronic device and transmits the necessary code to activate the desired feature. It is particularly advantageous if the socket is placed behind a small door (which is normally closed) of the electronic device; in this case the microprocessor may be inserted by the customer, which makes installation considerably less expensive. When a one-chip microprocessor is used, the processor is preferably of the low power consumption type. It is even more preferable that the processor receive the energy necessary for operation from the received data pulses.

The invention will now be described by means of non-limiting examples, with reference to the accompanying drawings.

Figure 1:
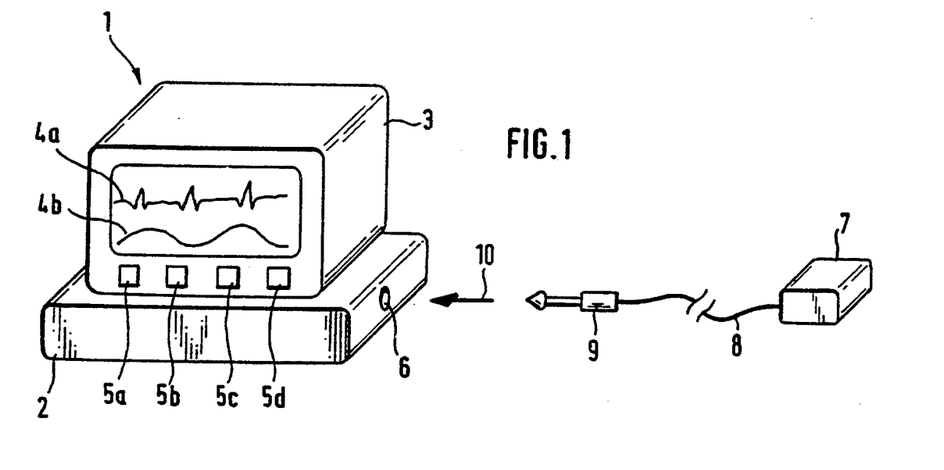
FIG. 1 depicts a first embodiment of the invention, the activating circuit being contained in a box and prepared for connection by means of a cable.

FIG. 1 depicts a medical monitor 1. The monitor consists of a box 2 and a display 3. Box 2 contains necessary hardware such as preamplifiers and analog signal processing circuits, digital components, at least one microprocessor, and circuitry necessary to operate the processor, particularly memory circuits. Display 3 is used to present the results of the various measurements. For the purpose of illustration, an ECG (electrocardiogram) waveform 4a and a blood pressure waveform 4b are depicted in FIG. 1. Display 3 further comprises several keys provided for user interaction. Some of these keys are labelled as 5a to 5d in FIG. 1. It is understood that an actual monitor provides more than the four keys shown in FIG. 1.

Operation of medical monitor 1 is controlled by its internal processor. This processor performs a variety of functions, e.g., waveform filtering and digital signal processing, setting of alarm limits and generating an alarm when such limits are exceeded, lead selection if an ECG is displayed, communication with a recorder or a remote station, etc.

Medical monitor 1 further comprises a jack 6, the function of which will be explained below.

Due to the multiplicity of program-controlled functions and the large amount and complexity of the software provided for the operation of the processor or processors controlling medical monitor 1, the need arises to change or update the programs contained in the memory of medical monitor 1 from time to time. Such may, e.g., be the case if software containing a programming error ("bug") is to be replaced, if a new program necessary to measure a new medical parameter or perform a new kind of data processing must be added (or, if already present, must be activated), or if special a test has to be performed.

FIG. 1 further shows an activating circuit, here in the form of a box 7. Box 7 contains a one-chip microprocessor and the necessary peripheral hardware to control the processor, as well as a serial interface. The interface is connected to a cable 8 which is terminated with a connector 9.

Box 7 is preferably used to add additional functionality to the programs contained in medical monitor 1, i.e. to provide new programs to the monitor. Box 7, cable 8 and connector 9 are separately sold in the form of an "update kit" containing these components as well as an instruction sheet. The customer simply connects box 7 with medical monitor 1, i.e., puts connector 9 in jack 6 as depicted by arrow 10. The memory provided with the microprocessor contained in box 7 comprises at least two modules, the first establishing a communication with medical monitor 1 and the second transmitting program code to the monitor. Once the first module has established the communication between the two devices, it transfers control to the second module which downloads the additional program code to medical monitor 1. The processor of monitor 1 is then able to execute the new program code.

It is understood that box 7 can also be used to activate programs already contained, but "hidden", in the software of medical monitor 1. Further, instead of adding new functionality, the downloaded program or activating code may be used to install or start special test sequences. Last but not least, box 7 may also be used to replace software containing a bug.

The first module contained in box 7 may further comprise certain controlling functions ensuring that box 7 is only used with one medical monitor. The operation of such controlling sequences is explained below with reference to FIG. 6.

Figure 2:
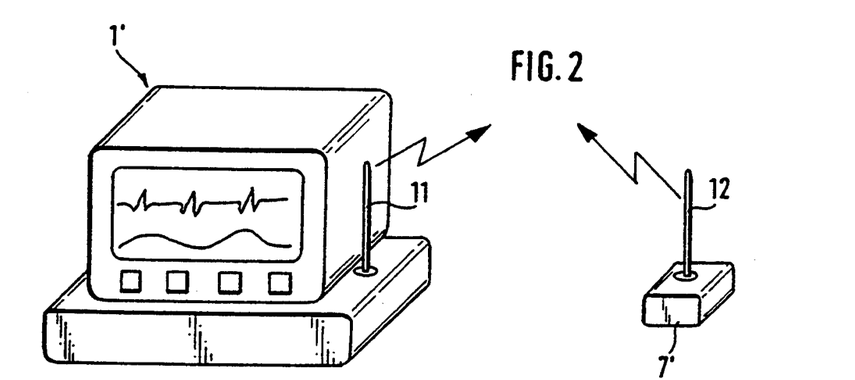
FIG. 2 depicts a second example with wireless communication between the activating circuit and electronic device.

Another embodiment is depicted in FIG. 2. Medical monitor 1' is equipped with an antenna 11, and box 7' is equipped with another antenna 12. In this example, communication between the medical monitor and the activating circuit is performed using wireless transmission of electromagnetic waves. The other components of the medical monitor and the box may be similar as in the embodiment of FIG. 1. It is understood that wireless communication may also be performed using infrared light, or the like.

Figure 3:
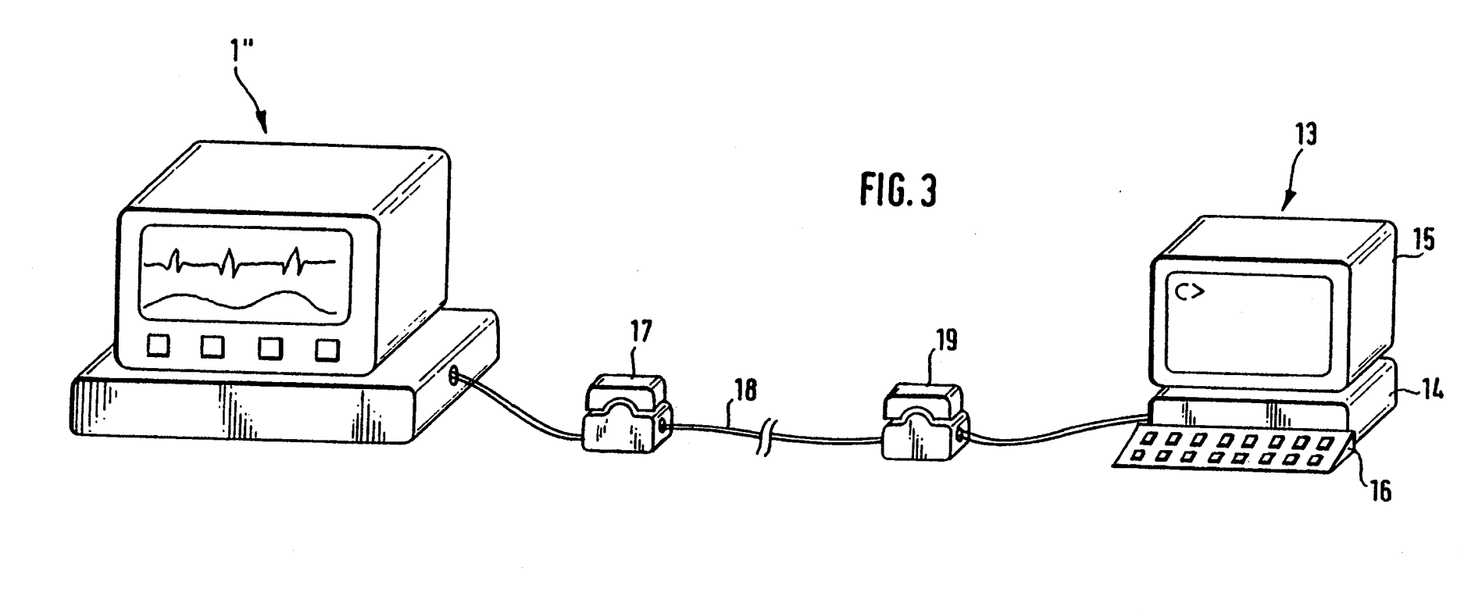
FIG. 3 depicts a third embodiment in which the connection is made via telephone lines.

FIG. 3 shows an embodiment in which the activating circuit comprises a personal computer 13. The personal computer consists of computer box 14, display 15, keyboard 16 and other common components such as, e.g., a disc drive and mouse (not shown).

Personal computer 13 and medical monitor 1" also contain modems. Communication between the two devices is set up from the modem of monitor 1" to a telephone 17, a telephone connection 18 and a second telephone 19 to the modem of personal computer 13.

The embodiment depicted in FIG. 3 is especially useful if a program needs updating, i.e., if a software bug has been detected and the program has to be exchanged with a new revision in which these errors have been corrected. The embodiment of FIG. 3 allows one to load the revised program on a multiplicity of monitors without sending a service engineer to every customer in possession of a monitor. Personal computer 13 may be located in the manufacturer's building and used to update all monitors already distributed, even those located in very remote places.

Figure 4:
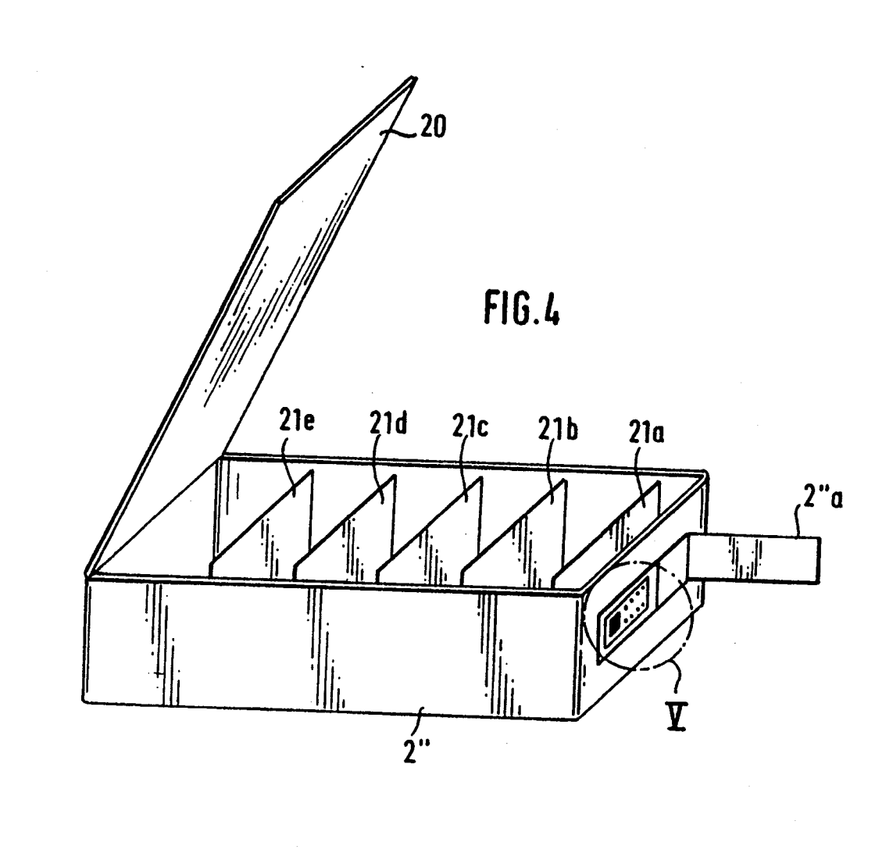
FIG. 4 depicts a fourth embodiment in which the activating circuit comprises a one-chip microprocessor.
Figure 5:
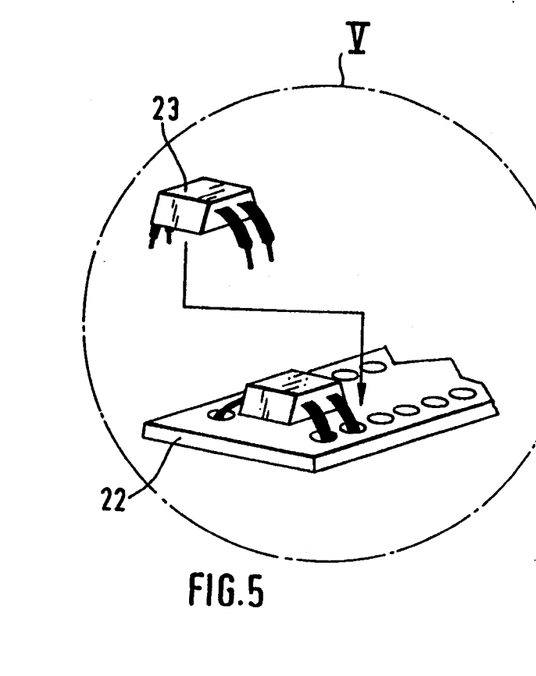
FIG. 5 depicts detail V of FIG. 4.

FIG. 4 depicts a hardware box 2" corresponding to hardware box 2 of medical monitor 1 in FIG. 1. For the purpose of illustration, cover 20 of this box is drawn in its open position. The hardware box contains a multiplicity of printed circuit boards 21a to 21e. Detail V of this figure is drawn in larger size in FIG. 5. Board 21a comprises an integrated circuit socket 22 which operates as a connection means to the medical monitor. The activating circuit consists of a very small one-chip microprocessor 23 with four pins-one for the supply voltage, one for ground, one for transmission and one for receiving information. Microprocessor 23 may be provided as optional equipment for the medical monitor. Socket 22 is normally hidden behind a small door 2"a. In order to install microprocessor 23, door 2"a has to be opened, and microprocessor 23 has to be inserted into socket 22. As box 2" need not be opened completely for this purpose, installation can be performed by the customer without the danger of causing electrical malfunction, particularly if socket 22 is appropriately isolated.

Figure 6:
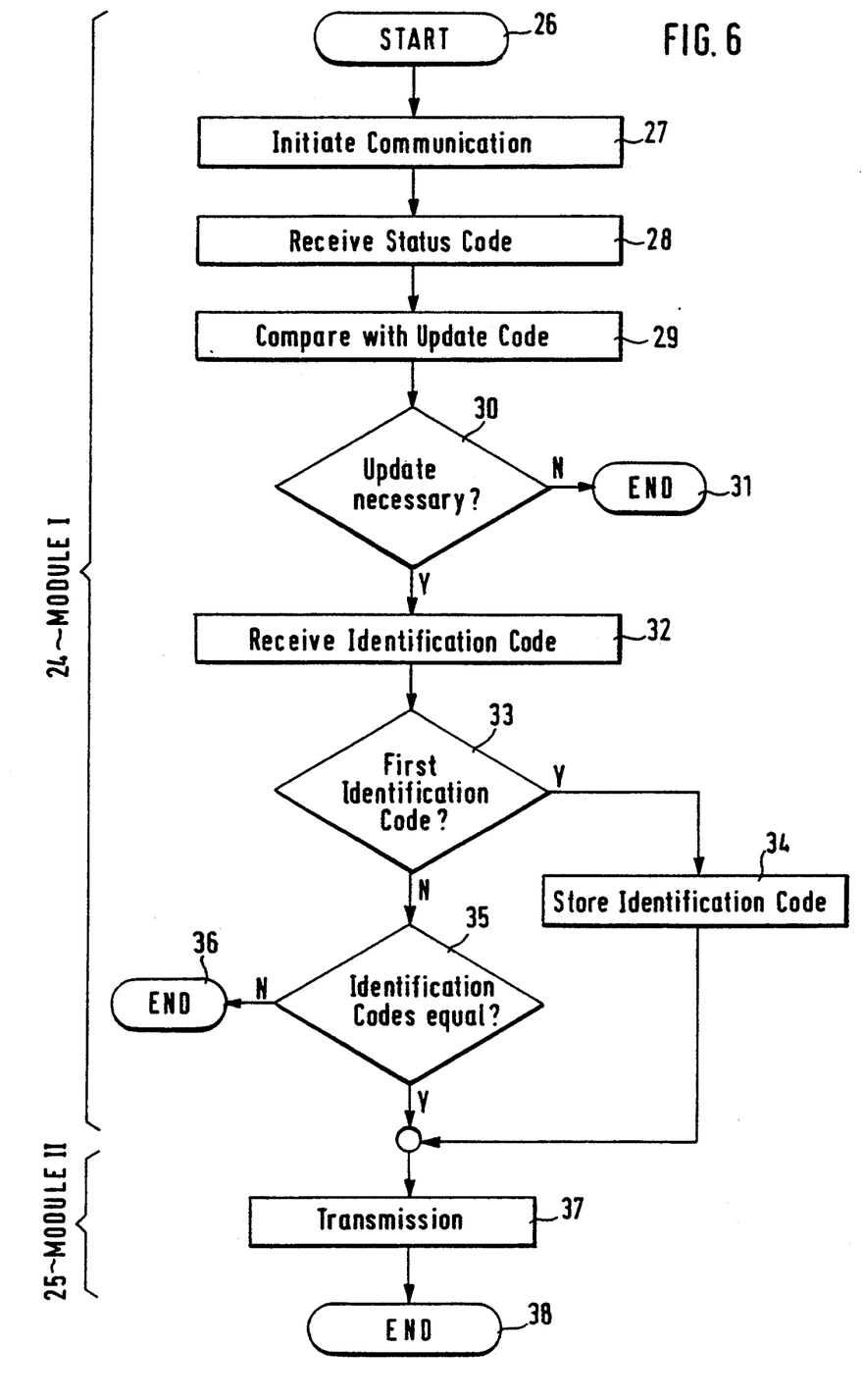
FIG. 6 is a flowchart of the basic operation of an activating circuit in accordance with the present invention.

FIG. 6 is a flowchart explaining the basic steps performed by the processor contained in the activating circuit. Two modules 24 and 25 perform data exchange between the activating circuit and the electronic device. Upon startup (step 26), module I 24 initiates communication with the electronic device (step 27). Next, the activating circuit receives the status code from the electronic device (step 28). The status code may be, e.g., either a date code or revision number. The purpose of the status code is to ensure that a program or activating code is only downloaded if the electronic device has not yet received an update from another activating circuit. This is particularly important if the activating circuit is prepared to communicate with only one electronic device, because otherwise it may happen that a program is downloaded to an electronic device which already contains the downloaded program; thus, the transmission would be useless, and the activating circuit would thereafter be unavailable for use with another electronic device.

In step 29, the received status code is compared with the update code contained in the activating circuit, and in step 30 a decision is made whether an update is necessary in light of the comparison. For example, if the status code and the update code contain the same date or revision number, the electronic device's memory already contains the program to be downloaded, and therefore operation is stopped (step 31).

If it is decided that the program in the electronic device must be updated, operation continues with step 32 in which the activating circuit receives an identification code from the electronic device. The identification code is a code unique for each electronic device, e.g. its serial number.

A decision is then made (step 33) whether this is the first identification code ever received by the activating circuit. If it is, this identification code is stored (step 34). If it isn't, the processor in the activating circuit checks whether the received identification code and the stored identification code are equal (step 35). If they are not equal, the activating circuit has already been used in conjunction with another electronic device and therefore cannot be used with the present electronic device; in this case, operation stops (step 36).

It must be emphasized that usually, if the identification codes are equal, the electronic device has already received the new programs and therefore, since the status code and update code are equal, operation stops at step 31. However, it may happen that a defective memory in the electronic device has been exchanged and therefore a new download procedure may be necessary.

When the activating circuit receives the first identification code or the identification codes are equal, control is transferred to module II 25 which handles the data exchange between the activating circuit and the electronic device (step 37). This operation is performed in a known manner, i.e., using a handshake procedure. When all programs, tests or activating codes have been transferred to the electronic device, operation stops (step 38).

Although specific, preferred embodiments of the invention have been described, the invention is not limited thereto; rather the true scope of the invention is set forth in the following claims.

What is claimed is:

1. An activating circuit for an electronic device operating at least partially under program control, said activating circuit comprising:
   (a) a processor;
   (b) a memory, coupled to said processor, for storing information;
   (c) means for coupling said activating circuit to said electronic device; and
   (d) a program stored in said memory, said program comprising:
      (i) a first module for setting up a communication with said electronic device; and
      (ii) a second module for transmitting information to said electronic device;
      wherein, said first module is set up to receive an identification code from said electronic device and to store said identification code in said memory only the first time it receives said identification code, and said first module is further set up to compare any subsequently-received identification code to the stored identification code and to prevent said second module from transmitting data and/or code to said electronic device if the stored and subsequently-received identification codes are not equal.

2. The activating circuit recited in claim 1, wherein said second module is set up to transmit program code to said electronic device.

3. The activating circuit recited in claim 1, wherein said second module is set up to transmit an activating code to said electronic device.

4. The activating circuit recited in claim 1, wherein said second module is set up to transmit a test code or program to said electronic device.

5. The activating circuit recited in claim 1, wherein said first module is set up to receive a status code from said electronic device, to compare said status code with a stored update code, and to transfer control to said second module if said status code is in a predefined relation to said update code.

6. The activating circuit recited in claim 5, wherein said first module is set up to transfer control to said second module when said status code indicates a lower revision number or an earlier date than said update code.

7. The activating circuit recited in claim 1, wherein said activating circuit is contained in a housing and said means for coupling comprises a cable.

8. The activating circuit recited in claim 7, wherein said processor is a one-chip processor with integrated nonvolatile, erasable memory.

9. The activating circuit recited in claim 1, wherein said processor comprises a computer and said means for coupling comprises a telephone line.

10. The activating circuit recited in claim 1, wherein said processor comprises an integrated microprocessor and said means for coupling comprises a multiplicity of pins of said integrated microprocessor, said pins insertable into a socket of said electronic device.

11. The activating circuit recited in claim 1, wherein said first module is set up to receive an identification code from each of a plurality n of electronic devices and to store the received identification code for each electronic device in said memory the first time said identification code for each electronic device is received, and said first module is further set up to compare any subsequently-received identification codes to the stored identification codes and to prevent said second module from transmitting data and/or code to an electronic device not providing one of the stored identification codes.

12. An activating circuit for an electronic device operating at least partially under program control, said activating circuit comprising:
   (a) a processor;
   (b) a memory, coupled to said processor, for storing information;
   (c) means for coupling said activating circuit to said electronic device; and
   (d) a program stored in said memory, said program comprising:
      (i) a first module for setting up a communication with said electronic device; and
      (ii) a second module for transmitting information to said electronic device;
      wherein, said first module is set up to receive an identification code from said electronic device and store said identification code in said memory means only the first time it receives said identification code; and said second module is set up to encode the transmitted information in accordance with the stored identification code.

13. The activating circuit recited in claim 12, wherein said second module is set up to transmit program code to said electronic device.

14. The activating circuit recited in claim 12, wherein said second module is set up to transmit an activating code to said electronic device.

15. The activating circuit recited in claim 12, wherein said second module is set up to transmit a test code or program to said electronic device.

16. The activating circuit recited in claim 12, wherein said first module is set up to receive a status code from said electronic device, to compare said status code with a stored update code, and to transfer control to said second module if said status code is in a predefined relation to said update code.

17. The activating circuit recited in claim 16, wherein said first module is set up to transfer control to said second module when said status code indicates a lower revision number or an earlier date than said update code.

18. The activating circuit recited in claim 12, wherein said activating circuit is contained in a housing and said means for coupling comprises a cable.

19. The activating circuit recited in claim 18, wherein said processor is a one-chip processor with integrated nonvolatile, erasable memory.

20. The activating circuit recited in claim 12, wherein said processor comprises a computer and said means for coupling comprises a telephone line.

21. The activating circuit recited in claim 12, wherein said processor comprises an integrated microprocessor and said means for coupling comprises a multiplicity of pins of said integrated microprocessor, said pins insertable into a socket of said electronic device.

22. The activating circuit recited in claim 12, wherein said first module is set up to receive an identification code from each of a plurality n of electronic devices and to store the received identification code for each electronic device in said memory the first time said identification code for each electronic device is received, and said first module is further set up to compare any subsequently-received identification codes to the stored identification codes and to prevent said second module from transmitting data and/or code to an electronic device not providing one of the stored identification codes.

23. A method for activating or adding new capabilities to an electronic device operating at least partially under program control, the method comprising the steps of:
   (a) coupling an activating circuit to said electronic device;
   (b) setting up a communication between said activating circuit and said electronic device;
   (c) transmitting an identification code from the electronic device to the activating circuit;
   (d) storing said identification code in a memory of said activating circuit only the first time said code is received by said activating circuit; and
   (e) thereafter comparing a received identification code with the stored identification code and activating or adding new capabilities to said electronic device by transmitting data and/or code to said electronic device only if said identification codes are equal.

24. The method recited in claim 23, further comprising the steps of transmitting a status code front said electronic device to said activating circuit, comparing said status code with an update code stored in said activating circuit, and activating or adding new capabilities to said electronic device when said status code indicates a lower revision number or an earlier date than said update code.

* * * * *